United States Patent [19]

Sklarski

[11] Patent Number: 4,637,852
[45] Date of Patent: Jan. 20, 1987

[54] NEOALKOXY TITANATE IN HIGH DENSITY MICA LAMINATES

[75] Inventor: Dennis J. Sklarski, Deerfield, N.H.

[73] Assignee: Essex Group, Inc., Fort Wayne, Ind.

[21] Appl. No.: 772,104

[22] Filed: Sep. 3, 1985

Related U.S. Application Data

[62] Division of Ser. No. 663,535, Oct. 22, 1984.

[51] Int. Cl.$^4$ .............................................. B32B 31/26
[52] U.S. Cl. .............................. 156/307.4; 156/307.7; 428/454; 428/446; 428/363
[58] Field of Search ...................... 156/60, 242, 307.4, 156/307.7

[56] References Cited

U.S. PATENT DOCUMENTS

| | | |
|---|---|---|
| 2,914,426 | 11/1959 | Gaines, Jr. . |
| 2,930,727 | 3/1960 | Baranyi ............................. 156/307.4 |
| 2,949,150 | 7/1957 | Traynor, Jr. . |
| 3,618,753 | 11/1971 | Glasspoole . |
| 4,122,062 | 10/1978 | Monte . |
| 4,286,010 | 8/1981 | Staley et al. ........................ 428/215 |
| 4,371,579 | 2/1983 | McCaskey et al. ................. 428/204 |
| 4,374,892 | 2/1983 | Roberts ............................... 428/233 |

OTHER PUBLICATIONS

Titanate Coupling Agents-Developments 1981 by S. J. Monte and Sugarman, Elastomeric, Jul. 1983, pp. 30–34.
Conclusion of Titanate Coupling Agents-Developments 1981 by S. J. Monte and G. Sugarman, Elastomerics Aug. 1983 pp. 29–31.
Processing of Composites with New Neoalkoxy Titanate Coupling Agents by Salvatore J. Monte and G. Sugarman, Revision of Presentation given to: Society of Plastics Engineers 1st International Conference Additives, Blends & Composites, Apr. 10-11, 1984.

*Primary Examiner*—Lorraine T. Kendell
*Attorney, Agent, or Firm*—Alan C. Cohen

[57] ABSTRACT

The present invention comprises a high density, moisture resistant, high temperature stable mica laminate. Said laminate comprises plurality of mica papers, impregnated with a polysiloxane binder containing an organic neoalkoxy titanate and a metal naphthenate. A process of preparing said mica laminates is also disclosed. The laminates of this invention have exceptional structural qualities, moisture resistance, stain resistance, and densities of 1.5 g/cc or greater.

3 Claims, No Drawings

NEOALKOXY TITANATE IN HIGH DENSITY MICA LAMINATES

This is a division of application Ser. No. 663,535 filed on Oct. 22, 1984, and now abandoned.

CROSS REFERENCE TO RELATED APPLICATIONS

This application relates to U.S. application Ser. No. 627,244, filed July 2, 1984 for HIGH DENSITY MOISTURE RESISTANT MICA SHEET by A. Doyle and D. Sklarski and U.S. application Ser. No. 649,348, filed Aug. 11, 1984 for HIGH DENSITY, MOISTURE RESISTANT MICA CYLINDERS by A. Doyle and D. Sklarski.

TECHNICAL FIELD

The field of art to which this invention pertains is mica containing composite material.

BACKGROUND ART

Mica containing articles have been used for many years as electrical insulating structures or for thermal insulation. Typically, such mica articles are composite structures formed by bonding mica sheeting with a bonding agent such as an alkyd, vinyl or a silicone material. Such articles have good dielectric strength, heat stability and are relatively inexpensive. Such articles are used as supporting insulation, for glowing red hot resistance wire heating elements for use in electric toasters, hair dryers, curlers, etc., high temperature thermostats, control devices, strip heaters and baseboard heaters. In addition, they are also used for gaskets and spacers in other electrical appliances. However, these mica products are susceptible to attack by moisture, are relatively easy to fracture, and are not always uniform in thickness or dimensionally stable at high temperatures. In addition, such mica products are not stain resistant and have relatively poor machinability characteristics.

Therefore, what is needed in the art is a mica composite material which overcomes such problems.

DISCLOSURE OF THE INVENTION

The present invention is directed toward a relatively high density, mica sheet comprising a plurality of mica papers which are impregnated with about 5% to 14% by weight of a polysiloxane binder which contains an organic neoalkoxy titanate and a naphthenate and which has been formed such that the density of the mica sheet is greater than about 1.5 g/cc. Such mica sheet is also moisture resistant, thermally stable, dimensionally stable, stronger and more stain resistant than that of the prior art. In addition, such a material is scouring resistant and has improved machinability and punchability qualities.

Another aspect of the invention is a method of forming such sheet material by impregnating mica paper with about 5% to about 14% by weight of a polysiloxane binder which contains an organic neoalkoxy titanate and a metal naphthenate, stacking the impregnated papers on top of each other and densifying and curing the binder under pressure and temperature to form the high density moisture resistant sheets.

Other objects, features and advantages of the present invention will become more apparent from the following detailed description of the preferred embodiment.

BEST MODE FOR CARRYING OUT THE INVENTION

The mica paper used to practice this invention may comprise any continuous, thin mica paper, however, those made from muscovite or phlogopite mica are preferred. Which material is selected depends on the properties desired in the end product. Typically, where high dielectric properties are desired, muscovite will be used, whereas, if high temperature properties are desired, the phlogopite is generally selected. The mica paper is typically in the form of conventional water-disintegrated, integrated mica paper which may be prepared using conventional techniques. The thickness of the mica paper characteristically ranges from about 2 mils to about 20 mils with about 5 mils being preferred.

The binder which is used to form the mica laminate comprises any of the thermally crosslinkable silicone polymer systems which are used to form other mica laminates. The selection of which system to use depends on the properties desired in the final laminate. Since many of the mica laminates find uses in high temperature environments above 359° F. (180° C.), it is preferred that the binder system used be thermally stable at these elevated temperatures. The preferred systems are the polysiloxane polymers which are conventionally used in this field. The most preferred systems are methyl-phenyl polysiloxane or methyl polysiloxane which are available from Dow Corning Corporation, Midland, Mich., as Dow Corning 4-3136, Dow Corning 2104 or 2105 or 2106. These polymers typically cure at temperatures of about 400° F. (204° C.) to about 500° F. (260° C.) or higher, and when cured are thermally stable to temperatures of about 1000° F. (538° C.). It should be noted that the polysiloxne system used to practice this invention should not condense or outgas excessively while curing, for this may cause the formation of a defective laminate through the formation of blisters or voids in the laminate.

Any compatible organic neoalkoxy titanate may be mixed with the polymer system in the range from about 1% to about 4% by weight with about 2% being preferred. The neoalkoxy titanates which are most useful are those which are soluble in the polymer system, i.e. polysiloxane, and do not promote rapid cross-linking of the polymer which will shorten the shelf life of the system. Whether a neoalkoxy titanate causes too rapid cross-linking or not is dependent on the manufacturing process which is used to form the laminates. A manufacturing process which is fast, may tolerate a faster cross-linking process while a slower process will produce an inferior product. Some typical neoalkoxy titanates are listed in Table. I, with the preferred neoalkoxy titanate being neoalkoxy, tri(dioctypyrophosphato) titanate.

These neoalkoxy titanates are available from Kenrich Petrochemical Corporation of Bayonne, N.J.

Table I

Neoalkoxy, triisostearoyl titanate
Neoalkoxy, dodecylbenzenesulfonyl titanate
Neoalkoxy, tri(dioctylphosphato) titanate
Neoalkoxy, tri(dioctylpyrophosphato) titanate Conventional metal naphthenate driers are added to the base polymer in concentrations from about 0.5% to about 2%, by weight of the polymer, with about 1% being preferred. Examples of such metallic soap driers are manganese naphthenate, zinc naphthenate, tin naphthenate, cobalt naphthenate, etc. It is believed that the addition of these naphthenate driers coupled with the titanate are what give these mica laminates their superior moisture resistant properties.

A binder solution containing the above constituents to be applied to the mica paper, is typically prepared as follows:

Solvent is placed in a container in which the binder will be prepared. Such solvents are typically aromatic hydrocarbons in which all of the constituents are compatible such as toluene or xylene. The amount of solvent is not critical and is typically in the range of from about 40% to about 60% of the total volume of the solution.

The titanate is then added to the solvent and is stirred until the titanate is dissolved and the solution is clear. Typically, this is done at ambient temperatures about 60° F. (15° C.) to about 85° F. (30° C.). While the stirring continues, the naphthenate drier is added to the solution and stirred until dissolved. Again, this is done at ambient temperatures. To this solution is then added the polysiloxane and the mixture is stirred until homogenous, typically for about one-half hour to one hour at ambient temperatures. The polysiloxane is added in quantities such that the titanate and naphthenate will be in the proper concentrations and the balance of the binder is polysiloxane.

The mica paper is removed from the roll and placed on a flat surface, i.e. a table, conveyer belt, etc., and the paper is impregnated with the binder by any conventional technique, i.e. dripping. The amount of the binder applied is such that the final laminate contains about 5% to about 14% by weight binder and the application should be such that the binder is evenly distributed throughout the laminate. Other conventional impregnation techniques may be used to apply the binder to the paper such as dipping, or roll soaking, spraying, brushing, etc., and in certain processes, it may be desirable to coat both sides of the paper. The aromatic solvent present in the binder is then removed by exposing the paper and binder to temperatures high enough to cause the solvent to evaporate, but not so high as to cause the polymer to polymerize. Typically, these temperatures are about 250° F. (121° C.) to about 275° F. (135° C.). Typically, this is done by passing the paper through an oven or exposing it to radiant heat, etc.

The solvent free paper is then cut into the desired size and stacked one on top of the other to the desired thickness. Such thicknesses may vary from about 15 mils to about 2 inches or more. The number of layers required to achieve a given thickness will, of course, vary depending on the thickness of the mica paper, as well as the curing pressures. Typically, these precured laminates are made to allow for a loss in thickness after densification of about 10% to about 40%. The orientation of the sheets may be in any direction and is not critical. The stack is then placed in a press which is capable of generating pressures of between 100 psi to 1,000 psi or higher, and temperatures of from about 500° F. (260° C.) to about 1000° F. (538° C.). Any conventional press, which can achieve and maintain these pressures and temperatures, may be used. Typically, the laminate stack is placed in the press between the two platens. If more than one high density laminate is to be formed during the single curing process, a separator sheet, typically of Teflon ®, is inserted between the stacks as they are placed in the press. The laminates are then densified at the predetermined pressure and the binder is cured at or above the polymerization temperatures of the polymer under pressure, during the course of densification. Although any number of techniques may be employed to cure the polymer while it is under pressure, the preferred technique is to heat the platens through either electrical, steam, hot oil or other means to the desired temperature. It may also be desirable to have a release sheet or coating between the platens and the laminates to ensure an easy removal of the densified laminates from the press after curing. Typically, these laminates are densified at pressures from about 100 psi to about 1,000 psi and temperatures from about 500° F. (260° C.) to 1000° F. (538° C.) for about 6-10 hours or until the binder has substantially cured. The laminate is then allowed to cool to about 100° F. (37.8° C.) or below while still under pressure. The densified mica laminate may then be removed from the press. The particular curing or densifying cycle will vary depending on the binder being used, thickness of the laminate being formed and the temperatures and pressures at which the laminates are subjected. Typically, the process will entail slowly raising the laminate to the maximum densification conditions which would allow for any outgassing of the material prior to final densification. This can be done in a step-wise manner or a gradual increase. In addition, the cycle should not allow the polysiloxane binder to cure prematurely, preventing the laminate from being fully densified, resulting in an inferior product. Preferably, these parameters can be controlled by conventional electrical or computer control systems which would interface with the press.

The mica laminates formed using the present invention, typically range in thicknesses from about 15 mils to about 2 inches and have densities of about 1.5 g/cc to about 2.5 g/cc.

EXAMPLE I

A typical mica laminate was prepared from seven sheets of 4 mils muscovite mica paper which has been impregnated with 10% of the polysiloxane binder containing 2% of neoalkoxy, tri(dioctylpyrophosphato) titanate and 1% zinc naphthenate. The impregnated paper was then stacked, one on top of the other, and placed in the press, cured and densified in the following sequence.

Apply 500 psi to product at 300° F. (148.9° C.) for 45 minutes.

Lower pressure to 100 psi and raise temperature to 500° F. (260° C.) for 5 hours.

Hold 500 psi on product and 520° F. (271° C.) for 5 hours.

Cool to 80° F. (26.7° C.) under 100 psi.

Open press and remove product.

Such a mica laminate would be 0.5 mm (0.020") in thickness and have typical properties as follows:

| Apparent Density 2.05 g/cc | |
|---|---|
| Binder Content | 8% by weight |
| Flexural Strength Data: (ASTM D790) | |
| As Made | 35,300 psi |
| Conditioned 24 Hours @ 96% RH, @ R.T. | 28,300 psi |
| Immersed 1 Hour in Boiling H₂O | 19,000 psi |
| Immersed 24 Hours in Boiling H₂O | 18,500 psi |
| Immersed 24 Hours in Boiling H₂O, then dried | 21,000 psi |

| | |
|---|---|
| One Hour at 200° F. (93.3° C.) 24 Hour Immersion (ASTM D570) weight gain: | 0.19% |

It has also been determined that mica laminates prepared according to this method exhibit smoother surfaces, more uniform thicknesses, excellent machinability and punchability, stain resistance, and are remarkably stable in boiling water. No other known mica laminate possesses this quality. Another surprising result is that this method allows for production of thermally stable, moisture resistant, thick mica laminates up to about 2 inches in thickness. Laminates this thick will find uses as thermal and electrical barriers, etc.

In conclusion, the mica laminates prepared using the present method have remarkably and surprisingly different properties than other mica laminates produced in the past. The present laminates have smoother surfaces and significantly greater mechanical strength. The increase in structural integrity makes these laminates more like sheet metal than flaky composites and allows for a much cleaner and neater product with less waste subsequent to the machining operations. There are two very surprising properties which these laminates possess and which should open up new uses for mica products. One, these laminates are extremely stain resistant and this very important when one considers that a principal use of such laminates is in microwave ovens which are subject to fumes and food spills. Secondly, these laminates are capable of being immersed in boiling water intermittently without substantially changing their physical properties. Such novel laminates again, will allow for their use in many new and novel applications, as well as those conventional applications described earlier in the Background.

It should be understood that the invention is not limited to the particular embodiments shown and described herein, but that various changes and modifications may be made without departing from the spirit and scope of this novel concept as defined by the following claims.

We claim:

1. A method of making mica composite laminates comprising:

individually impregnating a plurality of mica papers with about 5 percent to about 14 percent by weight of a polysiloxane binder containing about 1 percent to about 4 percent by weight of a neoalkoxy titanate and about 0.5 percent to about 2 percent by weight of a naphthenate in an aromatic solvent, removing the aromatic solvent, stacking the solvent free mica papers, one on top of another, and densifying under pressure and temperature until the binder is cured, wherein the composite has a density greater than about 1.5 g/cc and can withstand immersion in boiling water for 1 hour without delaminating.

2. The method of claim 1 wherein the polysiloxane is methylphenyl polysiloxane or methyl polysiloxane, the titanate is neoalkoxy pyrophosphato titanate and the naphthenate is zinc naphthenate.

3. The method of claim 2 wherein the pressure is from about 100 psi to about 1,000 psi and the temperature is from about 500° F. (260° C.) to about 1000° F. (538° C.).

* * * * *

UNITED STATES PATENT AND TRADEMARK OFFICE
CERTIFICATE OF CORRECTION

PATENT NO. : 4,637,852

DATED : January 20, 1987

INVENTOR(S) : Dennis J. Sklarski and Arthur F. Doyle

It is certified that error appears in the above-identified patent and that said Letters Patent are hereby corrected as shown below:

On the Title Page, number [75] Inventor:, after "Dennis J. Sklarski, Deerfield, N.H.", insert --Arthur F. Doyle, Portsmouth, N.H.--

Signed and Sealed this

Twentieth Day of October, 1987

Attest:

DONALD J. QUIGG

Attesting Officer

Commissioner of Patents and Trademarks